United States Patent Office 3,363,666
Patented Jan. 16, 1968

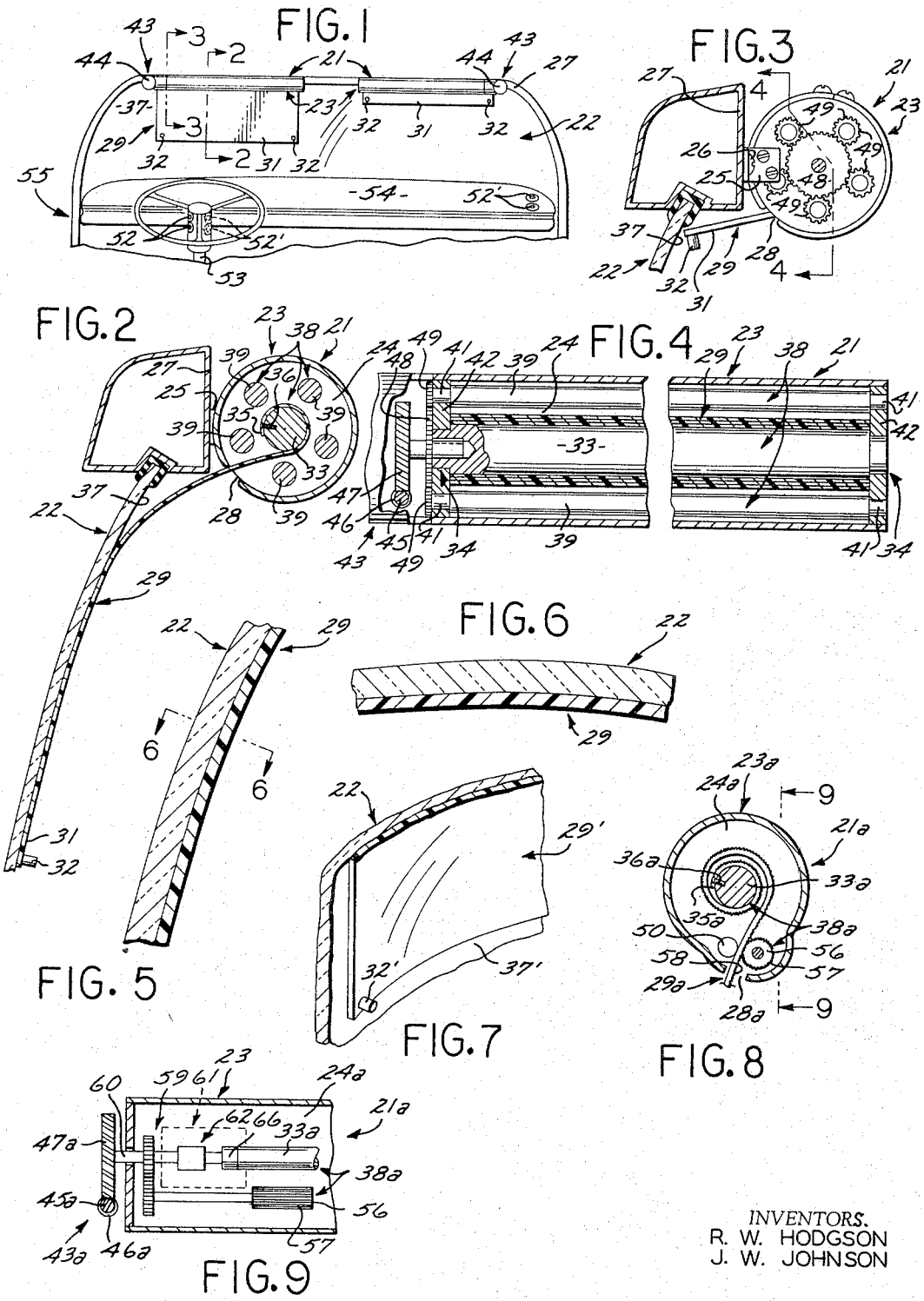

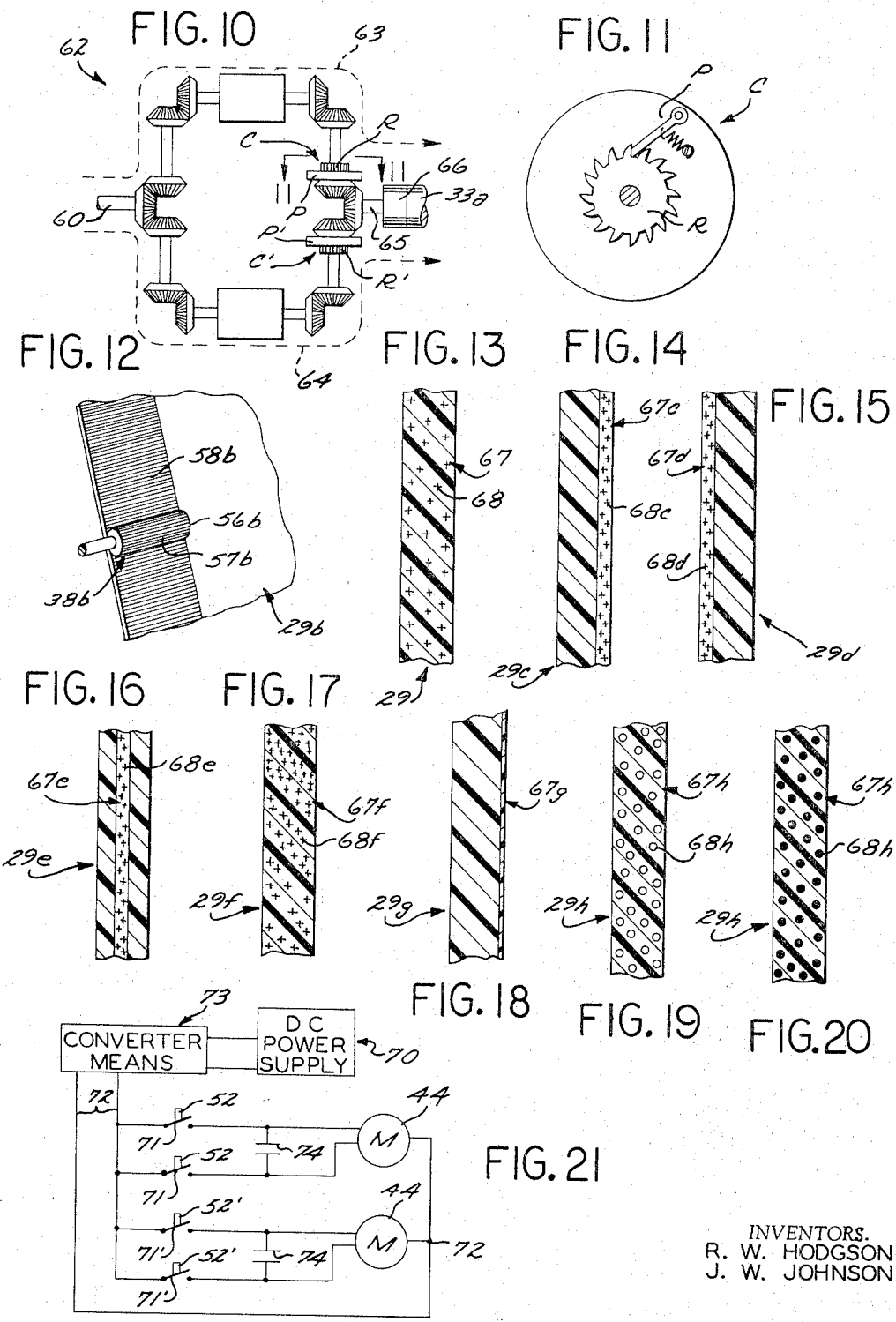

3,363,666
GLARE-INHIBITING AND GLARE-CONTROLLING APPARATUS FOR THE WINDSHIELD OF A MOTOR VEHICLE
Robert W. Hodgson, 3406 W. Washington Blvd., Los Angeles, Calif. 90018, and James W. Johnson, P.O. Box 175, Socorro, N. Mex. 87801
Filed Aug. 26, 1965, Ser. No. 482,714
13 Claims. (Cl. 160—23)

ABSTRACT OF THE DISCLOSURE

The specification discloses an improved glare-inhibiting and glare-controlling apparatus for a window, such as an automobile windshield, although not specifically so limited, which includes housing means provided with means for mounting same adjacent to an edge portion of the window with the housing having shade-passage slot means directed toward a surface portion of the window in an angular direction relative thereto having perpendicular and parallel components directed toward and along the surface portion of the window, respectively, and away from the housing means. The specification also discloses a glare shade of thin, stiff, resilient material having optical light-attenuating characteristics and having a normal at-rest unstressed configuration substantially similar to that of the surface portion of at least a part of the window against which the shade is to be controllably slidably abutted for glare-inhibiting and glare-controlling purposes. Also disclosed is a rotatable glare shade-storage shaft means rotatably mounted within the housing means and adapted to carry a controllably variable portion of the glare shade therearound in spirally rolled form when in stored, retracted relationship with respect to the abovementioned shade-passage slot means. Glare shade driving means is provided and is controllably operable into driving relationship with respect to the glare shade for controllable driving retraction thereof into the housing means and/or for controllable driving extension thereof outwardly through the glare shade-passage slot means and angularly toward the surface portion of the window. The glare shade driving means includes at least two glare shade engaging and driving portions in one preferred exemplary form of the invention disclosed, which are effectively provided with controllably operable torque-applying motor means for simultaneously driving same. The specification also discloses one preferred exemplary form of the invention wherein one of the glare shade engaging and driving portions mentioned above comprises the glare shade-storage shaft means mentioned above and the other one of the glare shade engaging and driving portions mentioned above comprises a plurality of driving shaft means positioned within the housing means and radially spaced outwardly from the glare shade-storage shaft means and spaced circumferentially from each other and effectively being rotatably supported within the housing means and being effectively provided with coupling means effectively connected between the two different glare shade engaging and driving portions and the torque-applying motor means for operation of said glare shade-storage shaft means and said plurality of outwardly and circumferentially spaced driving shaft means simultaneously and in correlated driving relationship with respect to the glare shade in response to operation of the torque-applying motor means.

Generally speaking, the present invention relates to glare-controlling apparatus and, more particularly, pertains to glare-inhibiting apparatus for a motor vehicle which, in one preferred form, is intended to be mounted adjacent to an edge (usually a top edge, although not specifically so limited) of the front window or windshield of a motor vehicle (although not specifically so limited) and adapted to be controllably operated so as to extend a glare shade across a greater or lesser area of said window and in at least partial effective contact therewith, whereby to control glare to any desired degree corresponding to the particluar glare conditions of any particular situation.

In one preferred form, the above mentioned contact of the glare shade with the window comprises an interior contact with the inner surface of the window, although the invention is not specifically so limited in all forms of the invention.

In one preferred form of the invention, the controllably extendable glare controlling and inhibiting glare shade mentioned above is of thin, relatively stiff, resilient material having optical light-attenuating characteristics suitable for the desired type of glare-inhibiting and glare-controlling actions to be effected thereby, and having a normal, at-rest, unstressed configuration substantially similar to the interior surface configuration of at least a portion of said window or windshield against which said glare shade is to be controllably and slidably abutted for said glare-inhibiting and glare-controlling purposes.

The above mentioned normal at-rest, unstressed configuration of the glare shade, and its positioning so that it is angularly slidably directed toward the inner surface of the window or windshield for slidable movement therealong, as described in greater detail hereinafter, act in a manner such as to cause very close abutting engagement of the forward surface of the glare shade and the rear or inner surface of the window or windshield, which is highly advantageous from the standpoint of physical, mechanical, and optical considerations and since it provides maximum open clearance for movement of a driver of a motor vehicle or other person sitting adjacent to said window or windshield.

It should be clearly noted that the light-attenuating characteristics of the glare shade are normally provided by the inclusion in the glare shade of what may be termed light modification means which, in one exemplary form of the invention, may effectively comprise substantially opaque (or opaquing) light modification means adapted to substantially completely inhibit or prevent the transmission of visible light rays therethrough.

However, in another form of the invention, said light modification means may be of a partially light-transmissive nature adapted to allow the partial transmission of inhibited, attenuated, and glare-reduced visible light rays therethrough so as to minimize glare.

Also, it should be noted that, in the latter form of the light modification means mentioned above, the light transmissive characteristics thereof may vary, in one version of the invention, as a function of physical location, usually increasing in effective optical density or light-attenuating effectiveness from bottom to top (although not specifically so limited) whereby to provide a variability of the light-attenuating and glare-reducing effectiveness of the glare shade in accordance with the relative positioning of the glare shade with respect to the widow or windshield and the position of the eyes of a driver of the motor vehicle, or other person sitting inside of the motor vehicle and looking outwardly through said window or windshield.

In other words, in the variable light-transmissive form of the light modification means mentioned above, a driver of a motor vehicle may merely cause the glare shade to be extended farther downwardly across the top portion of the motor vehicle window or windshield (or away from any other edge where it may be initially mounted) which will have the effect of increasing the effective optical density of the light modification means and/or the degree of light-attenuation across said particular portion (usually the top portion) of said window or windshield. This will effectively control the degree of light-attenuation and glare-reduction so as to optimize same for a particular driver of a vehicle, or other person sitting in the vehicle, while maintaining maximum visibility conditions through whatever portion of the window or windshield is needed for completely safe driving of the vehicle.

It should also be noted that, in certain forms of the invention, the above-mentioned light modification means may comprise what may be termed "phototropic" light modification means carried by the glare shade and characterized by the fact that its optical density is effectively variable in response to the reception of high amplitude light rays. In other words, in this specific form of the invention, the intensity of said light rays will bring about the effective variation of optical density of said "phototropic" light modification means whereby to optimize the degree of light attenuation and effective glare reduction produced thereby.

It should also be noted that, in one preferred form of the invention, the glare shade is adapted to be normally carried substantially completely within housing or casing means positioned adjacent an edge of said window or windshield (usually the top edge thereof, although not specifically so limited) with the thin, stiff, resilient material of the glare shade being stored in spirally rolled configuration within said housing or casing means and being effectively provided with glare shade-driving means for controllably extending a free end of said glare shade outwardly from said housing or casing means and angularly toward the inner surface of a portion of said window or windshield so as to make forcible angular abutment therewith, whereby to thereafter slide along said inner surface of said windshield into the hereinbefore mentioned interior abutting contact with a desired glare-control area of said inner surface.

In one preferred form of the invention, the above-mentioned glare shade-driving means may include at least two glare shade engaging and driving means portions or members effectively provided with controllably operable means for driving same and corresponding engaged portions of the glare shade in the correct correlated relationship for the hereinabove mentioned controllable extending movement (extension) of the glare shade and for oppositely directed controllable retracting movement (retraction) of the glare shade toward a fully retracted position substantially entirely within said housing or casing means (with the possible exception of the extreme free end thereof).

In one specific version of the present invention the multiple glare shade engaging and driving means portions or members mentioned above may be effectively coupled together.

Also, in certain forms of the invention, the above-mentioned driving means may effectively include linear travel compensation means adapted to effectively compensate for any linear travel differences which would otherwise occur by reason of the said different driving engagement locations of the multiple glare shade engaging and driving means portions or members with respect to different portions of the glare shade.

It should further be noted that the means for driving or operating the glare shade driving means may be manually operable means or power-energizable means, such as electric motor means or any other type of motor means, or the like, although not specifically so limited.

In the latter case mentioned above, all that is necessary to operate the device so as to cause any desired degree of controllable extension and/or retraction of one or more of such glare shades is to digitally operate a corresponding control button for correspondingly energizing the driving motor means. This is a particularly advantageous arrangement, since the control button (or plurality of such control buttons) may be located on the dashboard, instrument panel, steering wheel post, or any other extremely convenient location normally very close to one or the other hand of the driver of the vehicle.

The above is an extremely important feature since the diversion of a driver's attention even momentarily from the act of driving a vehicle is extremely hazardous and is quite likely to cause an accident. This has frequently occurred in the past when a driver of a vehicle has wished to pivot downwardly a conventional prior art sun visor or shade from its normal position lying immediately under the roof of a motor vehicle since it has required the diversion of the driver's eyes to the sun visor and also has required the use of at least one hand of the driver for the movement of the visor into a partial shading position. This momentary diversion of the driver's vision and attention from the road while the motor vehicle is being driven may be just enough to cause a dangerous accident, and in fact has frequently done so in the past.

The above-mentioned type of diversion of the driver's attention, and also movement of the driver's hand completely away from the motor vehicle control apparatus is not required by the above mentioned form of the present invention, where control button means may be positioned at the most convenient possible location for the driver and may merely require that he digitally actuate same in order to effect the desired degree of either extension or retraction of one or more of the novel light-attenuating glare shades of the present invention.

It is an object of the present invention to provide an improved glare-controlling and glare-inhibiting apparatus for a window (usually a front windshield) of a motor vehicle (although not specifically so limited) and adapted to normally store a novel light-attenuating glare shade in an unobtrusive manner, and adapted upon driving operation thereof to controllably, to any desired degree, extend said previously stored glare shade along, and in close abutting contact with, a desired interior portion of said window or windshield, and with said glare shade including light modification means adapted to substantially modify, attenuate, and reduce visible light rays passing through the window or windshield in a selected region with respect to a driver of the vehicle, or other person sitting inside the vehicle, so as to produce an optimized relationship of maximum visibility for said person looking outwardly through said window or windshield with respect to minimized glare received by the eyes of said driver or viewer through said window or windshield.

It is a further object to provide novel glare-controlling and glare-inhibiting apparatus of the character set forth hereinabove wherein the glare shade is of a shape, and has physical characteristics, such as to be adapted to be forcibly slidably abutted against the inside surface of a portion of the window or windshield, whereby to cause it to maintain virtual coextensive contact of substantially the entire adjacent surface areas thereof, with the attendant physical, mechanical, and optical advantages which flow therefrom.

It is a further object of the present invention to provide novel glare-inhibiting and glare-controlling apparatus of the character referred to hereinbefore, which is so positioned and directed with respect to the inner surface of a portion of the window or windshield, when controllably extended from the stored relationship, as to angularly abut said inner surface of said window or windshield whereby to bring about the forcible sliding abutting relative movement thereof and the above-mentioned close, substantially coextensive abutment of the adjacent surfaces of said glare shade and said window or windshield for the purposes set forth above.

It is a further object of the present invention to provide a novel glare-inhibiting and glare-controlling apparatus of the character referred to above, including driving means having at least two portions for driving the shade at spaced engagement locations in proper correlated relationship whereby to prevent expansion of the stiff, resilient material of the glare shade within the housing or casing means which would tend to lock the expanded glare shade therewithin—the novel multiple element and multiple location driving means of the present invention acting to completely prevent this type of self-locking action.

It is a further object of the present invention to provide novel glare-inhibiting and glare-controlling apparatus of the character referred to hereinbefore, wherein the driving means may include controllably energizable motor means (such as electric motor means or the like, although not specifically so limited) adapted to be controlled, in one preferred form, by digitally operable control button or switch means positioned for convenient digital access by a driver of the vehicle with an absolute minimum of physical motion and driver's attention required for controllable energization of said motor means in one manner for controllably extending one or more of the glare shades to any desired degree and in another manner for controllably retracting one or more of the glare shades to any desired degree.

It is a further object to provide a novel glare-inhibiting and glare-controlling apparatus of the type referred to above, wherein the glare shade may include at least a portion having light modification (or modifying) means adapted to substantially completely prevent the passage of visible light therethrough.

It is a further object to provide a novel glare-inhibiting and glare-controlling apparatus of the type referred to above, wherein the glare shade may include at least a portion having light modification (or modifying) means adapted to partially transmit visible light rays therethrough and to partially attenuate visible light rays in a particular desired manner for glare reduction purposes.

It is a further object to provide a novel glare-inhibiting and glare-controlling apparatus of the type referred to above, wherein the glare shade may include at least a portion having light modification (or modifying) means adapted to partially transmit light rays therethrough to a variable extent, depending upon location of the through-passing point on the glare shade, thus providing an arrangement where controllable extension of the glare shade to greater or lesser degree, can provide, at a given location on the window or windshield, a controllably variable degree of light attenuation and glare reduction.

It is a further object to provide novel apparatus of the character referred to above, wherein the light modification means of the glare shade may be of a "phototropic type," adapted to vary its effective optical density and, therefore, its light-attenuating and glare-reducing characteristics as a function of the amplitude of the light impinging thereupon, thus producing a glare shade effectively adapted to reduce glare the most at the very time when the incident light is of maximum amplitude, and would normally tend to produce maximum glare in the eyes of a driver of a motor vehicle or other person sitting within the motor vehicle.

It is a further object of the present invention to provide novel glare-inhibiting and glare-controlling apparatus for a window or windshield of a motor vehicle which embodies any of the various broad and/or specific aspects referred to above, which is of relatively simple, inexpensive, easy-to-operate, and substantially foolproof construction and which is of a nature such as to be readily adaptable for manufacture for, and easy installation in, a variety of different types and/or sizes of motor vehicles for controllable glare-reducing cooperation with the corresponding windows or windshields thereof. In other words, the apparatus is so constructed as to be easily manufactured and to be adaptable for widespread use in motor vehicles, although the invention is not specifically so limited and, broadly speaking, may be employed for such glare-reducing purposes in sliding abutting contact with various types of windows.

Further objects are implicit in the detailed description which follows hereinafter (which is to be considered as exemplary of the invention only and which is not to be construed in a specifically limiting sense), and will be apparent to persons skilled in the art after a careful study thereof.

For the purpose of clarifying the nature of the present invention, several exemplary embodiments are illustrated in the hereinbelow-described figures of the accompanying drawings and are described in detail hereinafter.

FIG. 1 is a fragmentary, reduced-size elevational view showing two glare-inhibiting and glare-controlling units.

FIG. 2 is a view taken in the direction of the arrows 2—2 of FIG. 1.

FIG. 3 is a fragmentary view taken in the direction of the arrows 3—3 of FIG. 1. However, in this view the glare shade is shown in substantially fully retracted relationship.

FIG. 4 is a fragmentary, partially broken-away view taken in the direction indicated by the arrows 4—4 of FIG. 3.

FIG. 5 is a larger-scale vertical sectional view showing the fully extended left glare shade in vertical section as it lies in close inner conforming abutment with the correspondingly shaped inner surface of the windshield.

FIG. 6 is a horizontal sectional view, taken in the direction of the arrows 6—6 of FIG. 5.

FIG. 7 is a fragmentary perspective view illustrating a slightly modified glare shade wherein the vertical precurvature illustrated in FIG. 5 is substantially eliminated, thus leaving only the horizontal precurvature of the type illustrated in FIG. 6.

FIG. 8 is a view generally similar to FIG. 3 but illustrates an exemplary modified form of the glare shade-driving means which includes two different driving elements or members and coupling means effectively connected therebetween and including linear travel compensation means.

FIG. 9 is a view taken in the direction of the arrows 9—9 of FIG. 8.

FIG. 10 is a view which is somewhat diagrammatic in nature and which illustrates the coupling means and the linear travel compensation means comprising a part thereof.

FIG. 11 is a further detailed view, taken substantially along the plane indicated by the arrows 11—11 of FIG. 10 and substantially enlarged from the FIG. 10 showing and illustrating the interior of the exemplary linear travel compensation means.

FIG. 12 is a fragmentary view illustrating a very slight modification of the driving capstan means and the co-operating portion of the glare shade illustrated in FIGS. 8 and 9.

FIG. 13 is an enlarged fragmentary cross-sectional view of one typical form of glare shade as illustrated in the first form of the invention for exemplary purposes and which embodies one particular type of light modification means which is indicated diagrammatically and symbolically in this view by the small crosses interspersed through the crosshatching of the plastic material. This arrangement merely illustrates the dissemination of said light modification means, which comprises optical filtering and light attenuating material dispersed throughout the cross section of the glare shade.

FIG. 14 is a view similar to FIG. 13 but illustrates an alternate arrangement wherein the light modification means, which comprises optical filtering and light attenuating material, is carried by the inner or rear surface of the glare shade rather than dispersed throughout the glare shade.

FIG. 15 is a view similar to FIG. 13 but illustrates an alternate arrangement wherein the light modification means, which comprises optical filtering and light attenuating material, is carried by the outer or front surface of the glare shade rather than dispersed throughout the FIG. 16 is a view similar to FIG. 13 but illustrates an alternate arrangement wherein the light modification means, which comprises optical filtering and light attenuating material, is mounted between two outer surface layers of the glare shade in a sandwich-like construction.

FIG. 17 is a view similar to FIG. 13 but illustrates an alternate arrangement wherein the light modification means comprises optical filtering and light attenuating material which is effectively variable in optical density as a function of position with respect to the glare shade.

FIG. 18 is a view similar to FIG. 13 but illustrates a further slight variation of the light modification means which, in this case, merely comprises a substantially opaque material which will, therefore, exclude all glare in the regions of the windshield covered thereby.

FIG. 19 is a view similar to FIG. 13 but illustrates a further variation of the light modification means which, in this case, is of a so-called "phototropic" type which is characterized by the ability to effectively vary its optical density in response to the reception of high amplitude light rays in one or more portions of the spectrum. This particular phototropic type of light modification means is arbitrarily and symbolically designated, before activation by incident light, by the small open circles shown in the midst of the crosshatching of the plastic material of the glare shade in this figure.

FIG. 20 is another view of the phototropic light modification means of FIG. 19 wherein the phototropic light modification means is designated, after activation by incident light, by the same small circles as shown in FIG. 19 which, however, are now shown as being filled in to be symbolic of the increasing optical density produced as a result of the reception of high amplitude incident light rays.

FIG. 21 is a circuit schematic view illustrating a typical circuit arrangement for the exemplary twin unit system illustrated in FIG. 1 wherein the two motors are individually and controllably reversibly operable by electric power supplied from the motor vehicle storage battery under the control of the multiple control pushbuttons.

Referring to FIGS. 1-6 for exemplary purposes, one illustrative embodiment of the invention takes a typical exemplary form wherein it comprises an improved glare-inhibiting and glare-controlling apparatus for a window or windshield, as generally indicated by the reference numeral 21.

It will be noted that in the example illustrated, the glare-inhibiting and glare-controlling apparatus 21 is shown in duplicate, whereby to comprise a left glare inhibiting and controlling apparatus and a right glare inhibiting and controlling apparatus. However, this is exemplary only and is not intended to specifically limit the invention to this precise arrangement.

Indeed, in certain forms of the invention, there may be only one such glare-inhibiting and glare-controlling apparatus, and in other forms of the invention more than one window may be provided with such glare-inhibiting and glare-controlling apparatus.

Furthermore, the apparatus is not limited specifically to being mounted with respect to a windshield, such as that designated generally by the reference numeral 22, but may be mounted with respect to other windows for similar glare-reducing purposes.

Since the form of the invention illustrated in FIGS. 1-6 shows the glare-inhibiting and glare-controlling apparatus 21 in duplicate, in order to simplify the detailed description thereof which follows, only one of said glare-inhibiting and glare-controlling apparatuses will be described in detail hereinafter—it being understood that the other is structurally and functionally identical, although positionally displaced and reversed.

It should also be noted that the particular positioning and mounting of the glare-inhibiting and glare-controlling apparatus 21, as illustrated in FIGS. 1-6, is exemplary of one preferred arrangement only and is not intended to specifically limit the invention to this particular positioning and mounting in all forms of the invention.

With reference to the left glare-inhibiting and controlling apparatus 21, which will be the one described hereinafter, it should be noted that the apparatus includes a longitudinal housing or casing means generally designated by the reference numeral 23, and which is shown as being of hollow, tubular, or cylindrical form defining a hollow interior region, as indicated by the reference numeral 24.

In the specific example illustrated, the housing or casing means 23 is fastened by suitable bracket means 25 and threaded fastener means 26 with respect to a top frame portion 27 surrounding the windshield 22. However, this type of mounting is exemplary only and is not intended to specifically limit the invention thereto, since many functionally equivalent mounting arrangements may be employed within the broad scope of the invention.

In the specific exemplary form of the invention illustrated in FIGS. 1-6, the housing or casing means 23 is provided with longitudinal shade-egress slot means 28, directed toward the inner surface of an upper portion of the windshield 22, as is best shown in FIGS. 2 and 3. The purpose of this will be described in detail hereinafter.

The invention also includes a glare shade of thin, stiff, resilient material having optical light-attenuating characteristics provided by light modification or modifying means and physically having a normal, at-rest, unstressed configuration substantially similar to the inner surface configuration of at least the part of the upper portion of the windshield 22 against which said glare shade is to be controllably slidably abutted by extension through said shade-egress slot means 28 in the manner best shown in FIG. 2, for glare-inhibiting and glare-controlling purposes.

In the exemplary first form of the invention illustrated in FIGS. 1-6, said glare shade takes a specific exemplary form, as indicated generally at 29, wherein it is preferably made of a stiff, resilient, thin sheet of plastic material which, in one exemplary preferred form, is normally adapted to be shaped quite similarly to the inside surface shape of the upper portion of that particular side of the window or windshield 22 which is adapted to be abutted by said glare shade. This configuration is best shown in FIGS. 5 and 6.

In particular, it should be noted that the normal unstressed curvature of the glare shade in a horizontal direction to conform to the horizontal curvature of modern conventional motor vehicle windshields, is particularly important and is clearly shown in FIG. 6.

In certain forms, the vertical precurvature of the unstressed glare shade 29, as shown in FIG. 5, may be eliminated and only the horizontal precurvature of said unstressed glare shade 29 may be employed. This is best shown in FIG. 7, wherein the fragmentarily shown slightly modified glare shade is generally designated by the reference numeral 29'.

In any case, the glare shade 29 (or 29') is adapted to be normally stored within the housing or casing means 23 in a forcibly retracted and stressed manner and in a spirally rolled stored configuration, as best shown in FIG. 3, wherein substantially the entire glare shade 29 is spirally rolled and stored within the housing or casing means 23, with just the free end portion 31 and a grasping tab 32 positioned outwardly of the shade-egress slot means 28. The tab 32 may also be said to comprise a limiting stop since it acts to prevent the free end 31 of the glare shade 29 from ever accidentally becoming completely retracted within the housing or casing means 23, which would be undesirable because it would be difficult to retrieve it and cause ejection of said free end 31 outwardly through the shade-egress slot means 28 if such occurred.

In the specific form illustrated in FIGS. 1-6, it will be noted that the storage of the glare shade 29 within the housing or casing means 23 is such as to cause it to be spirally rolled around and effectively stored upon a longitudinal, rotatable glare shade-storage shaft 33 having the central portion thereof lying within the housing or casing means 23 and being rotatably mounted at opposite ends of the housing or casing means 23 by the effective rotary mounting means indicated generally at 34.

In the specific example illustrated, the inner end of the glare shade opposite from the free outer end 31 thereof, is designated by the reference numeral 35, and is fastened to the longitudinal, rotatable glare shade-storage shaft 33 by a suitable fastening means such as indicated at 36. This provides a positive connection between the shaft 33 and the glare shade 29.

The invention also includes glare shade-driving means normally in driving relationship with respect to the glare shade for controllable retraction thereof, into the stored relationship best shown in FIG. 3, and for controllable extension thereof angularly downwardly and outwardly through the shade-egress slot means 28 into angular, forcible, interior abutment with the inner surface 37 of the upper portion of the window or windshield 22 whereby to extend the free end 31 of the glare shade 29 to any desired extent and to correspondingly move a corresponding portion of the glare shade 29 into substantially coextensive interior contact and abutment with said inner surface 37 of said upper portion of the window or windshield 22—in other words, substantially fully conforming thereto.

In the first form of the invention illustrated, said glare shade-driving means is generally designated by the reference numeral 38 and comprises the hereinbefore mentioned glare shade-storage shaft 33 and the fastenings of the inner end 35 of the glare shade 29 thereto by the fastening means 36, and also comprises the plurality of spaced, auxiliary driving shaft means 39 annularly spaced around said centrally positioned shaft 33 and each being effectively rotatably mounted by effective rotary mounting means 41 carried by end walls 42 of the housing or casing means 23.

Also, in the specific example illustrated in FIGS. 1-6, said particular form of said glare shade-driving means, indicated generally at 38, includes means for driving same, generally designated by the reference numeral 43, and comprising the driving motor 44, the motor shaft 45, the worm 46, and the worm wheel 47, all of which cooperate to rotate the center shaft 33 in a direction corresponding to the direction of rotation of the motor shaft 45.

The worm wheel 47 also rotates an additional gear 48, which is engaged with and drives a plurality of auxiliary gears 49, carried by the ends of corresponding ones of said auxiliary rotatably mounted driving shafts 39, whereby to cause them to be similarly rotated in the appropriate direction to properly drive interior portions of the stored spirally rolled glare shade 29, against the exterior of which said auxiliary drive shafts 39 forcibly peripherally bear, so that the combined driving effect of said auxiliary drive shafts 39 engaged with peripheral portions of the stored glare shade 29, and the driving effect of the central shaft 33, by reason of the fastening of the inner end 35 of the glare shade thereto by the fastening means 36, act in concert to produce effective extension of the free end 31 of the glare shade 29 outwardly through the shade-egress slot means 28 from the normal stored position shown in FIG. 3 into an at least partially extended windshield abutting and inner-surface contacting position and relationship as shown in FIG. 2, and also, in response to reverse energization of the driving motor 44, to effectively reverse the above described sequence of operations and to effectively retract the glare shade 29 from the extended window-abutting and conforming relationship shown in FIG. 2 into the retracted glare shade storage relationship shown in FIG. 3.

The important point to note in connection with the above described glare shade extending and glare shade retracting operations, is the fact that the effectively coupled driving relationship of the central driving shaft 33 and the plurality of annularly spaced auxiliary driving shafts 39 effectively causes free flowing extension and retraction of the glare shade 29 without any tendency to binding of the glare shade 29 with respect to the interior of the housing or casing means 23, which would normally be expected because of the stiff nature of the glare shade 29 and the fact that its normal unstressed configuration is completely different from the stressed, spirally rolled, stored configuration, best shown in FIG. 3.

It will readily be understood that, if it were not for the above mentioned novel coupled relationship of the multiple glare shade-driving means 38, the attempt to extend the glare shade 29 outwardly through shade-egress slot means 28 by merely rotating the center shaft 33, would tend to expand the resilient, stiff glare shade 29 within the interior of the hollow casing or housing means 23 in a manner somewhat simulating the action of a brake shoe, which would make it extremely difficult to extend the glare shade 29. Even the provision of anti-friction means within the housing or casing means 23 does not eliminate this and provide free-flowing extending and also retracting movement of the glare shade 29 in as effective a manner as the novel multiple-element and multiple-location glare shade-driving means indicated generally at 38.

It should be clearly noted that the position of the shade-egress slot means 28 and, correspondingly, the position of the free end 31 of the glare shade 29, is so angularly related with respect to the upper inner surface 37 of the window or windshield 22 as to cause close sliding abutment and conformation of the extended glare shade 29 with respect to said inner surface 37 of the window or windshield 22.

However, this effect is further enhanced in the arrangement shown in FIGS. 1-6 by reason of the fact that the direction of the spiral rolling or winding of the glare shade 29 when in the retracted, stored relationship shown in FIG. 3, is such that the above-mentioned extending movement causes a reverse bend of the free end 31 of the glare shade 29 upon extension thereof into sliding interior abutment with said inner surface 37 of the upper portion of the window or windshield 22.

Operation of the electric motor means 44 in either direction can be controllably achieved by operating either of the pair of push buttons 52 shown in FIG. 1 as being mounted on the steering column 53 of the motor vehicle, which is generally indicated at 55 (although they may be mounted on the dashboard 54, or at any other convenient location). This provides an arrangement which requires an absolute minimum of movement of the driver's hand in order to press one of said push buttons 52 and cause the glare shade 39 to be controllably extended downwardly to any desired degree and to there stop upon release of said push button, or to cause the reverse operation by pressing the other push button, which will cause oppositely directed operation of an electric motor 44 whereby to retract or move the glare shade 29 upwardly to any desired degree or to fully retract same with respect to the housing or casing means 23.

It will be noted that, because of the convenient positioning of the push buttons 52, the above-mentioned operations can be done without requiring that the driver move his hand to any great extent while driving the motor vehicle and without requiring that the driver divert his attention to any substantial degree from the important task of driving the motor vehicle.

It should be noted that a similar pair of push buttons 52' may be carried by the dashboard or instrument panel 54 of the motor vehicle 55 in a position conveniently located for digital access by a person sitting at the right side of the automobile in a position such as to normally look out of the motor vehicle in a forward direction through the right portion of the window or windshield 22, which has its glare controlled by the duplicate right glare controlling and glare inhibiting apparatus indicated at 21 and carried by the right side of the windshield frame 27.

However, in certain forms of the invention, it should be noted that the right hand pair of controlling push buttons 52' may, alternatively, be carried by the steering wheel column 53 or may be paralleled by a duplicate set of such push buttons carried by the steering column 53 as indicated in phantom at the right side of the steering column 53 in FIG. 1. In this modification of the invention, the driver can effectively control the extension and retraction of both of the glare shades 29 of the duplicate glare controlling and glare inhibiting units 21, mounted at the left and right sides of the window or windowshield 22. This might be desirable under some conditions of use where glare might strike the eyes of a driver of a motor vehicle from a light source positioned at a low level and sharply to the right of the driver so as to pass through the right portion of the window or windshield 22, and thence to the eyes of the driver of the vehicle. However, since this type of glare is rather rare, in the most common forms of the invention the right glare shade 29 would, in most instances, be controlled by a person sitting to the right of the driver of the vehicle and controlling same by the right pair of push buttons 52'.

In most forms of the invention the conventional motor vehicle electrical system, which normally includes storage battery means and either a DC generator or an alternator and a rectifier, will effectively comprise what may be termed electric power supply means for supplying the electric power controlled by the push buttons 52 (and 52') for controllably energizing either or both of the driving electric motor means 44 in either of two directions for glare shade extending movement or for glare shade retracting movement. Since such an electrical system of a motor vehicle is well known in the art and since such electrical circuit arrangements for controllable reversible energization of electric motor means are also well known in the art and do not comprise the essential novel feature of the present invention, they are shown only in electrical schematic form in FIG. 21.

FIGS. 8–11 illustrate a slight modification of the glare shade-driving means which is indicated generally by the reference numeral 38 in the first form of the invention and which is designated generally by the reference numeral 38a in this modification of the invention.

Since this modification is structurally and functionally very similar to the first form of the invention illustrated in FIGS. 1–6, all of the similar portions are designated by similar reference numerals, followed by the letter a, however.

In this modification, the glare shade-driving means 38a includes the central shaft 33a, which is substantially identical in all respects to the central rotatable shaft 33 of the first form of the invention and which is fastened to the inner end 35a of the glare shade 29a by fastening means 36a in a manner identical to that shown at 35 and 36 in the first form of the invention.

Also, in this modification, said central rotatable shaft 33a is driven in either of two directions by the same type of motor means and gear means as illustrated in detail in the first form of the invention, and as described with great particularity hereinabove and which, therefore, need not again be described in detail.

However, in this modification, there are no annularly positioned auxiliary rotatable drive shafts of the same type as those shown at 39 in the first form of the invention. Instead, in this modification of the invention, there is an auxiliary glare shade-driving member 56 which is positioned adjacent to the glare shade-egress slot means 28a and which is in controllable driving engagement with respect to an outer peripheral portion of the spirally wound stored glare shade 29a carried within the housing or casing means 23a for driving same in an extension manner outwardly through the egress slot means 28a or for driving said glare shade 29a in a retraction manner so as to draw it inwardly through said egress slot means 28a in accordance with the direction of operation of the driving electric motor means (such as shown at 44 in the first form of the invention).

In the particular example of this modification of the glare shade-driving means 38a, which is illustrated in FIGS. 8–11, the engagement of the driving capstan means 56 with respect to the outer peripheral portion of the spirally wound stored glare shade 29a, is provided by reason of the fact that the capstan driving means 56 has tooth means 57 which effectively comprise pinion gear means, while the adjacent and engaged surface of the glare shade is provided with small relatively unobstrusive tooth means 58 which can be said to effectively comprise rack means. The tooth means comprising the effective rack means 58 is engageable with, and driven by, the tooth means comprising the effective pinion gear means 57, which is effectively driven by motor means (such as that shown at 44 in the first form of the invention) in a correlated manner with respect to the driving rotation of said central shaft 33a by said motor means in a manner such as to always prevent interior expansion of the resilient, stiff glare shade 29a within the hollow casing or housing means 23a to a degree such as to frictionally engage the inside surface thereof in a manner roughly analogous to a brake shoe, and which would tend to lock the glare shade 29a against further extending movement. The above is accomplished by the provision of coupling means effectively including linear travel compensation means adapted to effectively compensate for differences in the linear travel imparted to the glare shade 29a by reason of the different locations of the central driving shaft 33a and the driving capstan means 56 relative to the spirally stored glare shade 29a.

In other words, it will readily be understood that constant angular velocity of the central shaft 33a during glare shade-extending rotation thereof would cause a greater linear extension of the glare shade 29a at the beginning of such extending movement than at the end thereof by reason of the difference in the effective radius at which the outermost portion of the stored glare shade 29a lies with respect to the axis of the central shaft 33a.

However, it will also be readily understood that the capstan driving means 56 imparts a constant linear velocity to the end portion of the glare shade 29a during such extension thereof, and completely independent of the degree of extension of the glare shade 29a which has been effected.

Therefore, it is quite obvious that the driving capstan means 56 must be driven by the gear means 59 at a rate such as to cause a linear travel of the glare shade 29a substantially equal to the linear travel imparted to the glare shade 29a by the central drive shaft 33a when the glare shade 29a is in fully spirally rolled stored form (in other words under conditions when said central shaft 33a imparts a maximum rate of linear travel to the glare shade 29a).

However, it will also be clear that as the glare shade 29a is controllably extended to a greater and greater degree, the driving capstan means 56 will want to advance the glare shade 29a faster than the central drive shaft 33a will allow. Therefore, the connection between the output shaft 60 of the worm wheel 47a, shaft 45a and the central shade-driving shaft 33a is provided with an effectively intervening coupling means, indicated generally at 61, which includes linear travel compensation means, designated generally by the reference numeral 62, as best shown in FIGS. 10 and 11, and which operates to correct the relative linear travel relationship of said central drive shaft 33a with respect to the driving capstan means 56 whereby to always prevent interior expansion of the stiff, resilient glare shade 29a within the hollow housing or casing means 23a into interior frictional engagement therewith which, as previously mentioned, would tend to lock it and prevent further extending movement of the glare shade 29a.

In the specific example illustrated, in FIGS. 8–11, the linear travel compensation means 62 comprises a two-speed power transmission means including two different power transmission paths, indicated diagrammatically and schematically at 63 and 64, extending therethrough between the effective input shaft 60 and the effective output shaft 65 and having different effective ratios of input to output. The first power transmission path 63, is effectively coupled or connected between the motor shaft 45a and the central shaft 33a when the motor is operated in a glare shade-extending direction and is effectively decoupled or disconnected when the motor is reversed, and the second power transmission path 64 is effectively coupled or connected between the motor shaft 45a and the central rotatable shaft 33a when the motor is operated in a glare shade retracting manner and is effectively decoupled or disconnected when the motor is reversed, thus causing the shaft 33a to be rotated at a different speed, during glare shade extending operation thereof, from the speed of said shaft during glare shade retracting operation thereof.

The output-to-input ratio provided by the first power transmission path 63 is such as to cause the central shaft 33a to rotate during glare shade-extending operation thereof, in a manner such that the maximum linear rate of extension of the glare shade 29a imparted thereto by said shaft 33a (which will occur at the very beginning of a glare shade-extending operation) will be substantially equal to the glare shade-extending linear rate of travel imparted by the driving capstan means 56.

On the other hand, the second power transmission path 64 has a greater output-to-input ratio such that the rate of linear travel imparted to the glare shade 29a thereby during a glare shade-retracting operation of the apparatus under minimum linear travel rate conditions insofar as the movement imparted by said central shaft 33a is concerned (which will occur at the very beginning of a glare shade-retracting operation), will be substantially equal to the linear travel velocity imparted to the glare shade 29a by the driving capstan means 56 during such glare shade-retracting operation of the apparatus.

In order to compensate for an improper linear travel rate imparted to the glare shade 29a by the central shaft 33a at the inadequate speed at the end of a glare shade-extending operation and the excessive speed at the end of a glare shade-retracting operation, connection of either of the two power transmission paths 63 and 64 to the central glare shade-driving shaft 33a is effectively provided by way of a slip coupling means 66 which may be of any conventional type and which is adapted to slip at a predetermined (and, in certain cases, controllably adjustable) torque; said slip coupling means 66 being connected between the shafts 65 and 33a.

This exemplary system for effectively compensating for linear travel differences imparted to the glare shade 29a by the driving capstan means 56 and the central driving shaft 33a includes, as mentioned above, one exemplary form of the linear travel compensation means, indicated generally at 62 in the modified form of the invention illustrated in FIGS. 8–11, and which provides the two different output-to-input ratio power transmission paths 63 and 64 for the purposes described in detail above.

As pointed out above, it is necessary that the first power transmission path 63 be effectively coupled or connected between the motor shaft 45a and the central shaft 33a only when the motor 44 is operated in a glare shade-extending direction, and that said first power transmission path 63 provide an effectively de-coupled or disconnected power transmission path when the direction of operation of the motor 44 is reversed into a glare shade-retracting direction.

Also, as pointed out above, it is necessary that the second power transmission path 64 be effectively coupled or connected between the motor shaft 45a and the central shaft 33a *only* when the motor 44 is operated in a glare shade-retracting direction, and that said second power transmission path 64 provide an effectively de-coupled or disconnected power transmission path when the direction of operation of the motor 44 is reversed into a glare shade-extending direction.

While various unidirectional clutch or coupling arrangements may be effectively oppositely connected in the first and second power transmission paths 63 and 64, respectively, whereby to provide just this type of arrangement, one exemplary form of such a unidirectional effective clutch or coupling means positioned in said first power transmission path for unidirectional coupling in one direction of rotation of the motor 44, is generally indicated at C, and a similar unidirectional coupling means in the second power transmission path 64 for coupling engagement in the opposite direction of rotation of the motor 44, is indicated generally at C'.

Since each of these unidirectional coupling means C and C' are identical in construction, although positionally reversed for coupling in response to opposite directions of rotation, only the first mentioned coupling means C will be described at this point, it being understood that the description is equally applicable to the other coupling means C'.

It should be noted that the coupling means C comprises a toothed ratchet wheel or gear R, driven by appropriate power transmission means comprising the first power transmission path 63, and a pawl-carrying means indicated at P positioned for spring biased engagement with the ratchet wheel or gear R whereby to be driven thereby when the ratchet wheel or gear R is rotated in one direction. Of course, it will be understood that when the ratchet wheel or gear R is rotated in the opposite direction, the toothed ratchet wheel or gear R will merely slip by and not drive or rotate the pawl-carrying means P. No further detailed description of this structure is thought necessary since the unidirectional coupling feature of ratchet and pawl structures are well known in the art.

It should be noted that the other coupling means C' in the second power transmission path 64 is of similar structure although the cooperative relationship of the pawl-carrying means P' with respect to the ratchet wheel or gear R' is oppositely related in a rotative sense whereby to provide through-driving rotative coupling thereof in the opposite direction of rotation of the motor shaft 45a from that which provides operative through-driving coupling of the other coupling means C in the first power transmission path 63.

It should be clearly understood that the above-described unidirectional coupling means C annd C' are merely exemplary of one type of structure which may be embodied in the linear travel compensation means indicated generally at 62. However, it should be clearly understood that many other types of unidirectional coupling means may be employed in lieu thereof and are intended to be included and comprehended within the broad scope of the present invention. This is also true of the entire linear travel compensation means 62.

Also, in the preferred modified form of the invention illustrated in FIGS. 8–11, the driving capstan means is effectively opposed by a back-up idler roller means 50 positioned on the opposite surface of the peripheral portion of the glare shade 29a from the surface thereof engaged by the driving capstan means 56. This facilitates good driving engagement between the capstan means 56 and the glare shade means 29a. However, various other arrangements may be employed.

In certain forms of the invention, the engagement between the driving capstan means 56 and the glare shade means 29a may not include a toothed means, but may merely comprise a frictional driving engagement which in certain cases may be enhanced by the provision of effective frictional means in lieu of the tooth means shown in FIGS. 8–11. This is illustrated fragmentarily in FIG. 12 wherein similar parts are indicated by similar reference numerals, followed by the letter b, however.

The glare shade indicated at 29 in the first form of the invention and at 29a and 29b in the first and second variant forms of the invention described above, may be of several different types, any one of which may be employed with any of the various types of glare shade-driving means, 38, 38a or 38b.

For illustrative purposes the first above mentioned glare shade means 29, shown in the first form of the invention, is of a type which can be said to include light modification means, generally and somewhat diagrammatically indicated at 67 in FIG. 13, 67c in FIG. 14, 67d in FIG. 15, and 67e in FIG. 16, and which effectively comprises partially-light-transmissive means which may comprise any sort of dye or conventional optical filtering material applied to either surface of the glare shade 29, disposed therethrough, or mounted in a sandwich-like layer anywhere between the two outer surfaces of the glare shade.

This may be of a nature such as to generally reduce or attenuate the amplitude of all visible light rays which pass through the glare shade 29 or may be of a type which attenuates various portions of the spectrum in a non-linear manner. For example, the partially-light-transmissive means comprising the light modification means (exemplified, but not specifically limited by the first form shown at 67) may be of a type adapted to attenuate infrared rays and/or ultraviolet rays to an extent greater than the attenuation of other portions of the visible light spectrum, thus reducing fatigue and possible eye injury which may be occasioned by the impingement upon the driver's eyes of an excessive amount of infrared or ultraviolet radiation.

The multiple small crosses 68 shown in the cross-section of the glare shade illustrated in FIG. 13 are intended to diagrammatically indicate the filtering material which effectively attenuates light rays whereby to allow only partial transmission of light rays therethrough, and which effectively comprises the light modification means 67 in this form of the invention.

However, as previously pointed out, the light-attenuating means need not be dispersed evenly throughout the glare shade 29 in the manner of the diagrammatically indicated light-attenuating particles or filtering means 68, but may be carried by the glare shade in any suitable manner.

FIG. 14 is a view generally similar to FIG. 13, but illustrates a slight variation thereof. Therefore, similar parts are indicated by similar reference numerals, followed by the letter c, however. In this variation of the invention, the light modification means 67c is carried by the inner or rear surface of the glare shade 29c rather than being dispersed throughout the glare shade in the manner illustrated in FIG. 13.

FIG. 15 is a view similar to FIG. 13, but illustrates a further slight variation thereof. Therefore, similar parts are indicated by similar reference numerals, followed by the letter d, however. In this variation of the invention, the light modification means 67d is carried by the outer or front surface of the glare shade 29d rather than being dispersed throughout the glare shade in the manner illustrated in FIG. 13.

FIG. 16 is a view generally similar to FIG. 13, but illustrates a further slight variation thereof. Therefore, similar parts are indicated by similar reference numerals, followed by the letter e, however. In this variation, the light modification means 67e is mounted between two outer surface layer portions of the glare shade 29e whereby to comprise a sandwich-like construction.

FIG. 17 is a view generally similar to FIG. 13, but illustrates a slight variation thereof. Therefore, similar parts are indicated by similar reference numerals, followed by the letter f, however. In this variation of the light modification means 67f, the diagrammatic showing of the filtration or light-attenuating means 68f corresponding to those shown at 68 in the first form of the light-modifying means 67 shown in FIG. 13, are of effectively variable optical density from bottom to top of the glare shade 29f and, in this specific exemplary illustration of this variation, are shown in a manner providing increasing optical density in accordance with position as one moves from the bottom of the glare shade 29f upwardly.

It will readily be understood that this provides an arrangement which makes it possible to controllably extend the glare shade 29f downwardly along the inside of a window or windshield (such as that shown at 22 in the first form of the invention) which will have the effect of varying the effective optical density and, therefore, glare reduction provided at any given line of sight level with respect to said window or windshield. In other words, as glare along the upper edge or the upper portion of the window or windshield increases, a user of this modification of the invention may merely controllably extend the glare shade 29f downwardly to a slightly greater extent which will effectively reduce the glare of light passing through said upper portion of the window or windshield. Conversely, as glare becomes less, the glare shade 29f can be partially retracted or moved upwardly so as to reduce the optical density of the portion of the glare shade 29f lying over said portion of the window or windshield 22, so as to compensate for the reduction of incident light.

FIG. 18 is a view similar to the first form of the glare shade illustrated in FIG. 13, but shows a further variation of the light-modification means, which in this case is designated by the reference numeral 67g, wherein it merely comprises a substantially opaque material which will, therefore, substantially exclude all gare at that particular level as it is controllably extended downwardly along the inside of the window or windshield 22 illustrated in the first form of the invention shown in FIG. 1. In this view, portions similar to those illustrated in FIG. 13 are designated by similar reference numerals, followed by the letter g, however.

FIG. 19 illustrates a further slight variation of the light modification means of the glare shade, and because of the similarities to the earlier forms of the invention, similar parts are indicated by similar reference numerals, followed by the letter h, however, in this variant form thereof.

In this version, the light modification means 67h comprises filtration or light-attenuating means or material similar to that diagrammatically shown at 68 in the first form of the light-modifying means illustrated in FIG. 13. However, in the variation, said light-attenuating or modification means or material 68h is of a phototropic type which is characterized by the ability to effectively vary its optical density in response to the reception of high amplitude light rays in one or more portions of the spectrum. In other words, when either no light or low amplitude light is received by the glare shade 29h, said phototropic light-attenuating means 68h has very little effective optical density and provides a very low level (or substantially no) light attenuation.

However, as the amplitude of the incident light rays (to which said phototropic means 68h is responsive) increases, said phototropic means 68h effectively increases its optical density in a manner such as to provide a substantially greater degree of light attenuation and glare reduction.

The phototropic means 68h of this form of the invention is shown in FIG. 19 in its low optical density condition *before* having been optical-density-increased by the reception of high amplitude incident light, while FIG. 20 illustrates said phototropic means 68h *after* having been optical-density-increased by the reception of high amplitude incident light; said phototropic means 68h, *before* such activation, being arbitrarily and symbolically designated by the small open circles shown in the midst of the crosshatching of the plastic material of the glare shade in FIG. 19 and being arbitrarily and symbolically designated, *after* such activation by incident light, by the same small circles as shown in FIG. 19 which, however, are shown in FIG. 20 in a filled-in form whereby to be symbolic of the increased optical density produced as a result of the reception of high amplitude incident light rays.

While there are various types of such phototropic means available, several exemplary ones will now be referred to merely to clarify the general nature of such means and they are not to be construed in a specifically limiting sense.

One such phototropic means may comprise a mixture of methylene blue indicator and ascorbic acid. Other such phototropic means include triphenyl methane dyes, such as crystal violet and malachite green, if first bleached with potassium hydroxide or potassium cyanide; ammonium molybdate and citric acid in water solution, and p-phenylene diamine, and potassium nitrate applied in a dried, coated layer. These have various response speeds and, together with certain other newly developed phototropic materials, can provide virtually any desired response speed which may be desired under normal conditions of use.

It should, of course, be understood that upon the removal of the incident light which has effectively caused the increase in effective optical density of the phototropic means 68h, the effective optical density thereof will be reduced and returned to its initial, extremely small or substantially negligible value.

Of course, it should be understood that, in certain applications of the invention, the motor means may be modified substantially and, in certain versions, may comprise manually operable means for applying torque to the glare shade-driving means.

FIG. 21 is a simple, electrical circuit schematic view which illustrates one exemplary and non-specifically limiting circuit for connecting the control push buttons 52 and 52' and the two driving electric motors 44 (or any of the equivalent driving motors in the different variant forms of the invention) with respect to a suitable power source, which is indicated diagrammatically in FIG. 21 by the reference numeral 70 and which may comprise the motor vehicle storage battery, generator, alternator and rectifier, or any substantial equivalent thereof.

It will be noted that the various push buttons 52 and 52' operate corresponding normally open switches 71 and 71' so connected in the electric circuit 72 as to controllably reversibly energize either or both of the driving electric motors 44 when digitally depressed and to de-energize same when digitally released.

In the particular arrangement illustrated in FIG. 21, the power source or supply, indicated generally at 70, is shown as comprising a DC power supply which, in a conventional motor vehicle, is of relatively low voltage. One advantageous type of motor 44 for use in operating each of the glare controlling and glare inhibiting units, indicated generally at 21 in FIG. 1, is an alternating current motor of a brushless type which requires an AC voltage input thereto which is usually, in the most widely available forms of such motors, of substantially higher magnitude than the DC voltage output of a conventional motor vehicle power supply or source such as indicated at 70. Therefore, in the exemplary form illustrated in FIG. 21, a DC-to-AC converter, indicated generally at 73, is connected between the DC power supply 70 and the remainder of the circuit 72 whereby to supply an appropriate AC voltage to whichever one (in some cases, both) of the two driving motors 44 energized by closure of one of the switches of either (in some cases, both) of the two pairs of normally open switches 71 and 71'. The capacitors 74 are connected with respect to the two reversible AC motors 44 in a conventional manner for such controllably reversible AC brushless motors.

It should, of course, be clearly understood that while the above AC motor arrangement, including the DC-to-AC converter 73, provides a highly efficient arrangement, the invention is not specifically so limited and various other motor arrangements of either AC or DC types may be employed. Of course, in the event that DC motors are employed, the converter means 73 may be eliminated entirely. It should also be noted that in certain cases the motors may be of other types adapted to be energized by sources of energy other than electrical energy.

While several different exemplary forms of the present invention are illustrated in the figures, as described in considerable detail hereinbefore, it should be clearly noted that the invention is not specifically limited to the combinations of the various novel features of the invention embodied in the specific exemplary forms illustrated in the figures and described in detail hereinbefore. Actually, various different embodiments of the novel individual features of the invention in various different desired combinations and/or subcombinations thereof are within the broad scope of the present invention and are intended to be included and comprehended herein.

For example, the novel light modification means of the glare shade of the present invention in the various different forms exemplified by FIGS. 13 through 20, and equivalents thereto, may be employed independently of the remainder of the apparatus and/or in combination with any suitable type of means for mounting same for controllable positioning with respect to a window or the like through which light and/or glare may be controllably modified, attenuated, and/or reduced.

This is true irrespective of the type of mounting means and/or means for controllably extending and retracting the glare shade.

Also, it should be noted that the novel mounting means, and means for controllably extending and retracting a glare shade as disclosed in considerable detail in several different exemplary forms in the drawings accompanying this application and in the descriptive material set forth hereinbefore, may be modified within the broad scope of the teachings of the present invention and may include various structural and/or functional substantial equivalents thereof.

Also, it should be noted that either the glare shade, per se, or the glare shade in combination with means for moving it with respect to a window may be employed wherever glare is to be reduced. In other words, the invention is not limited to use in a motor vehicle for use in reducing glare across a portion of the windshield thereof, but may be employed for reducing glare wherever an excessive amount of light exists and is to be effectively glare-reduced. This may even be true with respect to reflected rather than transmitted light and, in such cases, the effective window may comprise a reflective surface rather than a transmissive surface, or any combination thereof.

It should be understood that the figures, and the specific descriptions thereof, set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

What is claimed is:

1. An improved glare-inhibiting and glare-controlling apparatus for a window, comprising: housing means provided with means for mounting same adjacent to an edge portion of said window, said housing means being provided with shade passage slot means directed toward a surface portion of said window in an angular direction relative thereto having perpendicular and parallel components toward and along said surface portion of said window, respectively, and away from said housing means; a glare shade of thin, stiff, resilient material having optical light-attenuating characteristics and having a normal at-rest unstressed configuration substantially similar to that of said surface portion of at least a part of said window against which said shade is to be controllably slidably abutted for glare-inhibiting and glare-controlling purposes; a rotatable glare shade-storage shaft means rotatably mounted within said housing means and adapted to carry a controllably variable portion of said glare shade therearound in spirally rolled form when in stored retracted relationship relative to said shade-passage slot means, said glare shade being effectively secured to said rotatable glare shade-storage shaft means; and glare shade-driving means controllably operable into driving relationship with respect to said glare shade for controllable driving retraction thereof into said housing means and for controllable driving extension of said glare shade outwardly through said glare shade-passage slot means and angularly toward said surface portion of said window, said glare shade-driving means including two glare shade engaging and driving portions effectively provided with controllably operable torque-applying motor means for driving same, one of said glare shade engaging and driving portions comprising said glare shade-storage shaft means and the other one of said glare shade engaging and driving portions comprising a plurality of driving shaft means positioned within the housing means parallel to and radially spaced outwardly from said glare shade-storage shaft means and spaced circumferentially from each other, said plurality of driving shaft means being rotatably supported within said housing means in said parallel, circumferentially spaced positions and being effectively provided with interengaged coupling means effectively connected between said two different glare shade engaging and driving portions, comprising said glare shade-storage shaft means and said plurality of outwardly circumferentially spaced driving shaft means, and said torque-applying motor means for operation of said different glare shade engaging and driving portions simultaneously in synchronized driving relationship with respect to said glare shade in response to operation of said torque-applying motor means.

2. Apparatus as defined in claim 1, wherein said glare shade is normally spirally wound, when stored on said rotatable glare shade-storage shaft means, in a direction such that the outer end edge of said glare shade is given a reverse bend as it is extended angularly into contact and slidable movement along said surface portion of said window.

3. Apparatus as defined in claim 1, wherein said optical light-attenuating characteristics of said glare shade are provided by the inclusion in said glare shade of light modification means adapted to provide for controllable glare reduction in accordance with the position of said glare shade with respect to said window.

4. Apparatus as defined in claim 1, wherein said optical light-attenuating characteristics of said glare shade are provided by the inclusion in said glare shade of light modification means adapted to provide for controllable glare reduction in accordance with the position of said glare shade with respect to said window, said light modification means comprising opaque means adapted to substantially completely inhibit the transmission of light rays therethrough.

5. Apparatus as defined in claim 1, wherein said optical light-attenuating characteristics of said glare shade are provided by the inclusion in said glare shade of light modification means adapted to provide for controllable glare reduction in accordance with the position of said glare shade with respect to said window, said light modification means comprising partially light-transmissive means adapted to allow the partial transmission of partially inhibited, attenuated, and glare-reduced light rays therethrough.

6. Apparatus as defined in claim 1, wherein said optical light-attenuating characteristics of said glare shade are provided by the inclusion in said glare shade of light modification means adapted to provide for controllable glare reduction in accordance with the position of said glare shade with respect to said window, said light modification means comprising partially light-transmissive means positioned in an optical density-varying manner as a function of vertical position with respect to said glare shade whereby to cause the light-transmissive characteristic thereof to vary as a function of vertical physical location.

7. Apparatus as defined in claim 1, wherein said optical light-attenuating characteristics of said glare shade are provided by the inclusion in said glare shade of light modification means adapted to provide for controllable glare reduction in accordance with the position of said glare shade with respect to said window, said light modification means comprising phototropic means carried by the glare shade and effectively optically density-variable in response to the reception thereby of high amplitude glare causing light rays.

8. An improved glare-inhibiting and glare-controlling apparatus for a window, comprising: housing means provided with means for mounting same adjacent to an edge portion of said window, said housing means being provided with shade-passage slot means directed toward a surface portion of said window in an angular direction relative thereto having perpendicular and parallel components toward and along said surface portion of said window, respectively, and away from said housing means; a glare shade of thin, stiff, resilient material having optical light-attenuating characteristics and having a normal at-rest unstressed configuration substantially similar to that of said surface portion of at least a part of said window against which said shade is to be controllably slidably abutted for glare-inhibiting and glare-controlling purposes; a rotatable glare shade-storage shaft means rotatably mounted within said housing means and adapted to carry a controllably variable portion of said glare shade therearound in spirally rolled form when in stored retracted relationship relative to said shade-passage slot means, said glare shade being effectively secured to said rotatable glare shade-storage shaft means; and glare shade-driving means controllably operable into driving relationship with respect to said glare shade for controllable driving retraction thereof into said housing means and for controllable driving extension of said glare shade outwardly through said glare shade-passage slot means and angularly toward said surface portion of said window, said glare shade-driving means including two glare shade engaging and driving portions effectively provided with controllably operable torque-applying motor means for driving same.

9. Apparatus as defined in claim 8, wherein one of said glare shade engaging and driving portions comprises said glare shade-storage shaft means and the other one of said glare shade driving portions comprises driving capstan means positioned adjacent to said glare shade-passage slot means and controllably drivingly engageable with respect to a peripheral portion of the spirally wound stored portion of the glare shade carried within the housing means for driving same in an extending manner outwardly with respect to said slot means or in a retracting manner inwardly with respect thereto.

10. Apparatus as defined in claim 9, wherein said glare shade is normally spirally wound, when stored on said rotatable glare shade-storage shaft means, in a direction such that the outer end edge of said glare shade is given a reverse bend as it is extended angularly into contact and slidable movement along said surface portion of said window.

11. Apparatus as defined in claim 8, wherein one of said glare shade engaging and driving portions comprises said glare shade-storage shaft means and the other one of said glare shade driving portions comprises driving capstan means positioned adjacent to said glare shade-passage slot means and controllably drivingly engageable with respect to a peripheral portion of the spirally wound stored portion of the glare shade carried within the housing means for driving same in an extending manner outwardly with respect to said slot means or in a retracting manner inwardly with respect thereto, said driving capstan means being provided with opposed back-up idler roller means positioned on the opposite side of said peripheral portion of said glare shade from the surface thereof engaged by said driving capstan means.

12. Apparatus as defined in claim 8, wherein one of said glare shade engaging and driving portions comprises said glare shade-storage shaft means and the other one of said glare shade driving portions comprises driving capstan means positioned adjacent to said glare shade-passage slot means and controllably drivingly engageable with respect to a peripheral portion of the spirally wound stored portion of the glare shade carried within the housing means for driving same in an extending manner outwardly with respect to said slot means or in a retracting manner inwardly with respect thereto, said driving capstan means and said peripheral portion of said glare shade being provided with cooperating engagement means.

13. Apparatus as defined in claim 8, wherein one of said glare shade engaging and driving portions comprises said glare shade-storage shaft means and the other one of said glare shade driving portions comprises driving capstan means positioned adjacent to said glare shade-passage slot means and controllably drivingly engageable with respect to a peripheral portion of the spirally wound stored portion of the glare shade carried within the housing means for driving same in an extending manner outwardly with respect to said slot means or in a retracting manner inwardly with respect thereto, said glare shade driving portions and said torque-applying motor means being effectively provided with coupling means connected therebetween and including linear travel compensation means adapted to effectively compensate for linear travel rate differences which would otherwise occur at the driving engagement locations of said two different glare shade engaging and driving portions with respect to said glare shade.

References Cited
UNITED STATES PATENTS

| | | | |
|---|---|---|---|
| 558,577 | 4/1896 | Spauling | 160—133 |
| 1,526,346 | 2/1925 | Kivikink | 296—97.4 X |
| 1,708,377 | 4/1929 | Cornell | 160—26 X |
| 2,134,414 | 10/1938 | Norcross | 350—276 |
| 2,248,538 | 7/1941 | Liebler | 160—133 X |
| 2,474,712 | 6/1949 | Aparicio | 350—276 X |
| 2,567,713 | 9/1951 | Kaplan | 350—311 X |
| 2,585,769 | 2/1952 | Hamlin. | |
| 2,710,274 | 6/1955 | Kuehl. | |
| 2,715,043 | 8/1955 | Schewel | 350—318 X |
| 2,874,770 | 2/1959 | Rohr et al. | 160—23 |
| 2,927,819 | 3/1960 | Johnson | 160—23 X |
| 2,934,139 | 4/1960 | Wardlaw et al. | 160—26 |
| 3,056,626 | 10/1962 | Browne | 296—97.4 |
| 3,078,343 | 2/1963 | Schulz et al. | 350—311 X |
| 3,183,033 | 5/1965 | Stulbach. | |
| 3,236,290 | 2/1966 | Lueder | 160—241 |

FOREIGN PATENTS

| | | |
|---|---|---|
| 738,298 | 8/1943 | Germany. |

DAVID J. WILLIAMOWSKY, *Primary Examiner.*

DENNIS L. TAYLOR, *Examiner.*